United States Patent
Yamaguchi

(10) Patent No.: US 6,766,975 B2
(45) Date of Patent: Jul. 27, 2004

(54) SPINNING REEL FOR FISHING

(75) Inventor: Nobuyuki Yamaguchi, Tokyo (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 10/230,083

(22) Filed: Aug. 29, 2002

(65) Prior Publication Data
US 2003/0146320 A1 Aug. 7, 2003

(30) Foreign Application Priority Data
Aug. 31, 2001 (JP) ..................................... P2001-264222

(51) Int. Cl.⁷ .............................................. A01K 89/01
(52) U.S. Cl. ........................................ 242/246; 142/45
(58) Field of Search ................. 242/246, 285, 242/290, 295, 301; 192/45

(56) References Cited

U.S. PATENT DOCUMENTS

| | | | |
|---|---|---|---|
| 5,211,273 A | * 5/1993 | Castens | 192/45 |
| 5,411,218 A | * 5/1995 | Uehara et al. | 242/245 |
| 5,520,273 A | * 5/1996 | Moribayashi | 192/45 |
| 6,135,255 A | * 10/2000 | Myers | 192/45 |
| 6,148,978 A | * 11/2000 | Mimura | 192/45 |
| 6,267,312 B1 | * 7/2001 | Farris et al. | 242/295 |
| 6,354,526 B1 | * 3/2002 | Morise | 242/295 |
| 6,484,858 B1 | * 11/2002 | Mimura | 192/45 |
| 6,530,535 B2 | * 3/2003 | Oishi et al. | 242/295 |

FOREIGN PATENT DOCUMENTS

JP   6-14680   1/1994

* cited by examiner

Primary Examiner—Emmanuel Marcelo
(74) Attorney, Agent, or Firm—Sughrue Mion, PLLC

(57) ABSTRACT

An outer-side holding member (5) of a braking device (A) is fitted to the inner side of a large-diameter recessed portion (2g) in a rear portion of the inner side of a fishing-line winding barrel portion (2h) of a spool (2) in such a manner as to be prevented from rotating, and is prevented from coming off. An adjusting member 8 is provided at a distal end portion of the spool shaft for adjusting braking force of the braking device by relatively displacing an outer-side holding member (5) and the inner-side holding member (7) of the braking device in an axial direction.

2 Claims, 5 Drawing Sheets

SPINNING REEL FOR FISHING

BACKGROUND OF THE INVENTION

The present invention relates to a spinning reel for fishing which has in its front a braking device utilizing the sliding frictional force of rolling members.

Conventionally, as a braking device for applying a braking force to the rotation of a spool which rotates when a fishing line is paid out, a multi-plate friction type comprised of a plurality of friction plates disposed between a non-rotating member and the spool has been generally known.

Instead of this multi-plate friction type, a spool braking device for a spinning reel for fishing is known in, for example, Japanese Patent Publication No. Hei. 06-014680, wherein inner- and outer-side holding members whose opposing surfaces are truncated cone-shaped are provided between the spool and the non-rotating member, a plurality of cylindrical rolling members are interposed between the inner- and outer-side holding members so as to be clamped therebetween by being disposed by being inclined by a predetermined angle to the left and the right with respect to the axis, to obtain stable braking performance over extended periods by utilizing the sliding friction occurring due to the rolling of the rolling members.

This related art is arranged such that the braking device utilizing the sliding friction of the rolling members is provided between a recessed portion formed in a front portion of the spool and a spool shaft to apply the braking force to the rotation of the spool. However, in view of the fact that the fishing line moistened with much water is wound round the spool and the fact that the fishing reel is used in a severe environment where water, dust, and the like are easily attached or enter, there is a drawback in that such water or the like is attached to or enters the braking device in the front portion of the spool at the time of actual fishing, causing a hindrance to the braking performance of the rolling members.

In addition, since a compact size is required in terms of the operationality, portability, and the like, there are limitations to the length and the quantity of the rolling members making up the braking device which is accommodated in the recessed portion in the front portion of the spool, so that a problem remains, among others, in that it is difficult to obtain a powerful braking force.

The problems to be solved are that, in a fishing spot where the environment of use is severe, the braking performance of the braking device in the front portion of the spool is likely to decline due to the effect of the attachment or entry of water, dust, or the like, and that a powerful braking force is difficult to obtain.

SUMMARY OF THE INVENTION

In view of the above-described drawbacks, the object of the invention is to provide a spinning reel for fishing which makes it possible to obtain a large braking force by making use of the dead space on the inner side of the rear portion of the spool, and in which water, dust, or the like is not directly attached to or enter the braking device, making it possible to obtain stable braking performance.

In order to solve the aforesaid object, the invention is characterized by having the following arrangement.

(1) A spinning reel for fishing comprising:
a spool shaft supported by a reel body;
a spool which includes a fishing-line winding barrel portion around which a fishing line is wound, and is rotatably supported by the spool shaft;
a braking device provided in a rear portion of an inner side of the fishing-line winding barrel portion for applying braking force to rotation of the spool, the braking device including,
an outer-side holding member which is non-rotatably attached to the spool and includes a tapered surface,
an inner-side holding member which is non-rotatably attached to the spool shaft and includes a tapered surface opposed to the tapered surface of the outer-side holding member, and
rolling members clamped between the outer-side holding member and the inner-side holding member; and
an adjusting member provided at a distal end portion of the spool shaft for adjusting the braking force by relatively displacing the outer-side holding member and the inner-side holding member in an axial direction of the spool shaft so as to adjust clamping force generated by the rolling members in cooperation with the outer-side holding member and the inner-side holding member.

(2) The spinning reel according to (1) further comprising a click mechanism interposed between the adjusting member and the braking device in the axial direction.

(3) The spinning reel according to (2), wherein the spool includes a partition wall portion defining the rear portion and a front portion of the fishing-line winding barrel portion.

(4) The spinning reel according to (3), wherein the click mechanism is provided in the front portion.

DETAILED DESCRIPTION OF PREFERRED EMBODIMENTS

Figure 1:
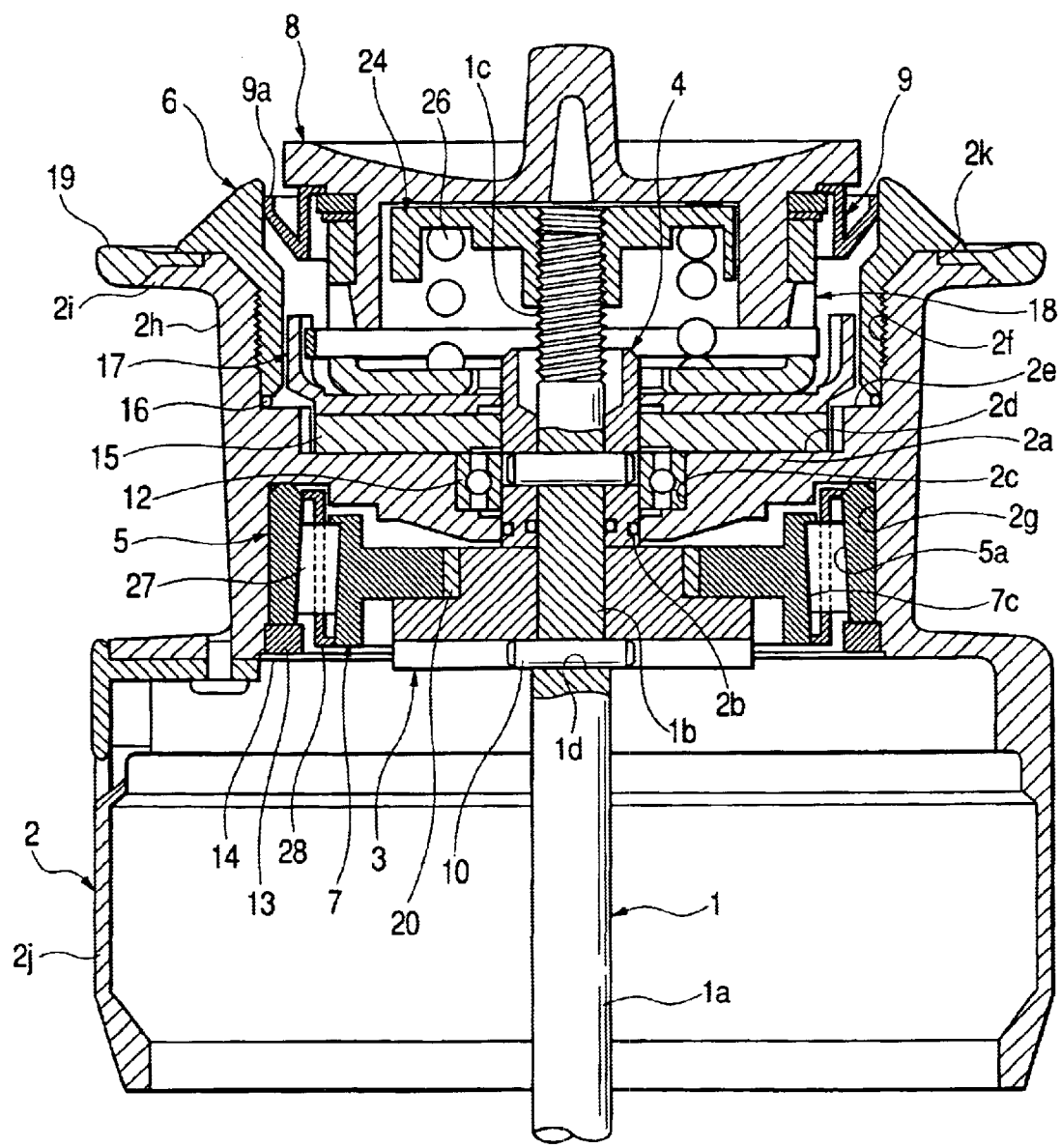
FIG. 1 is a sectional plan view of a spool of a spinning reel for fishing.
Figure 2:
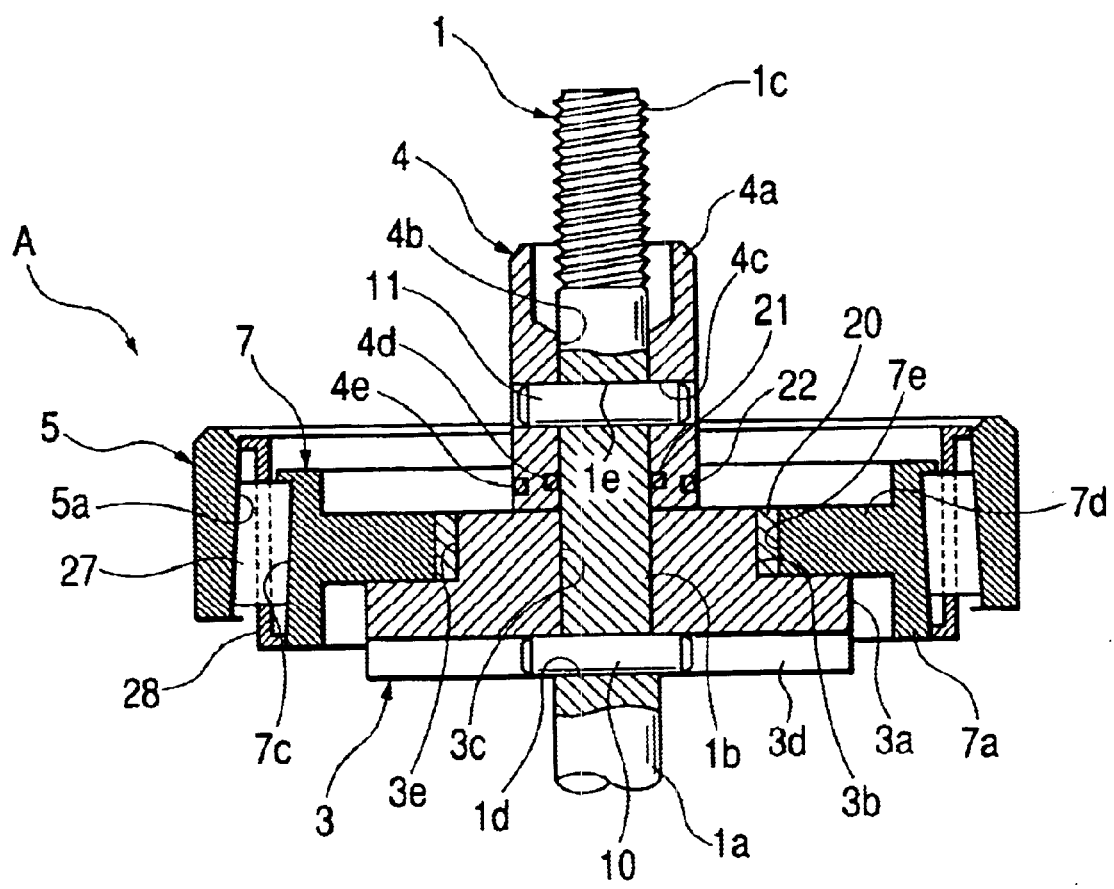
FIG. 2 is a sectional plan view of a braking device making use of the sliding frictional force of rolling members.
Figure 3:
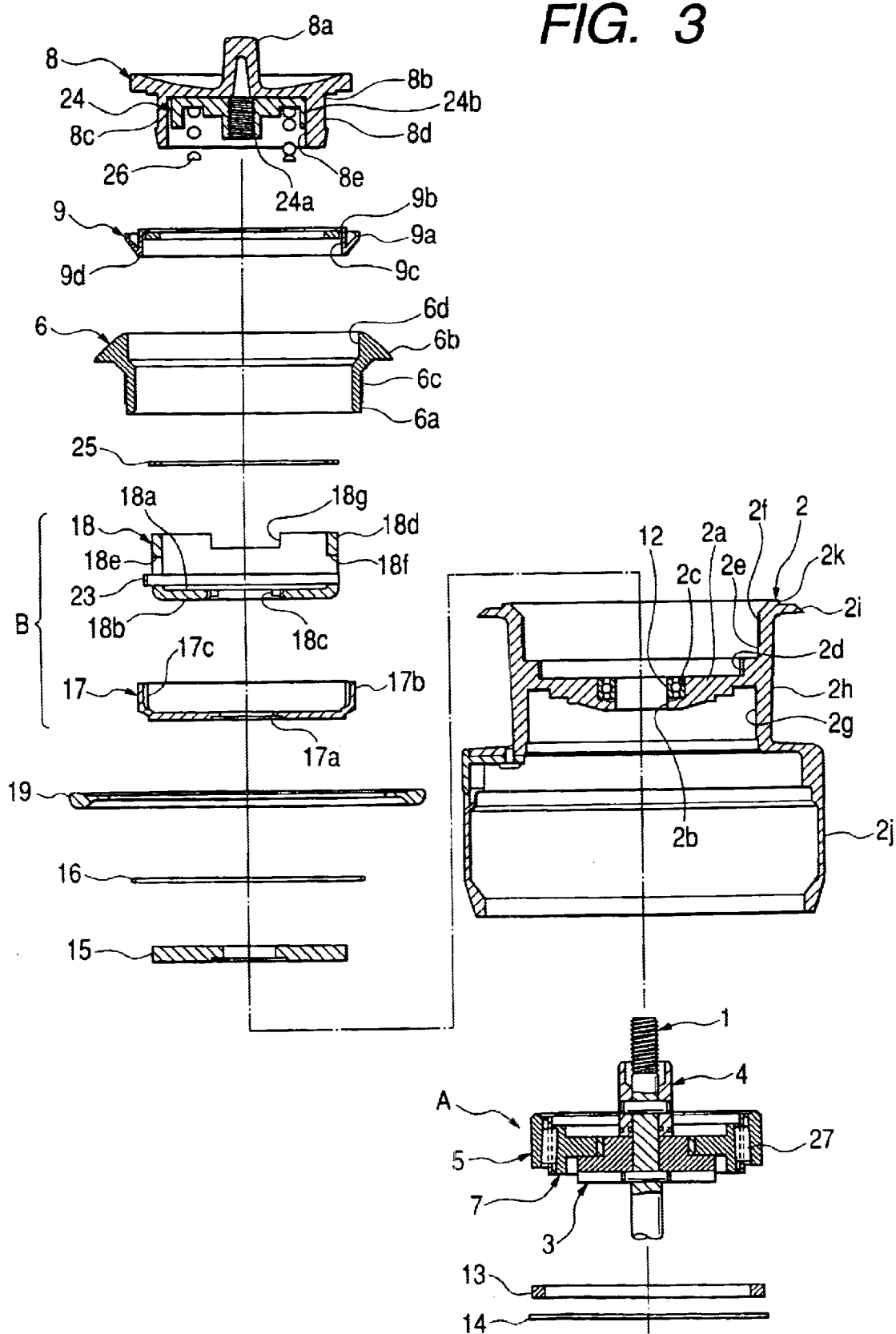
FIG. 3 is an exploded sectional plan view of the spool.
Figure 4:
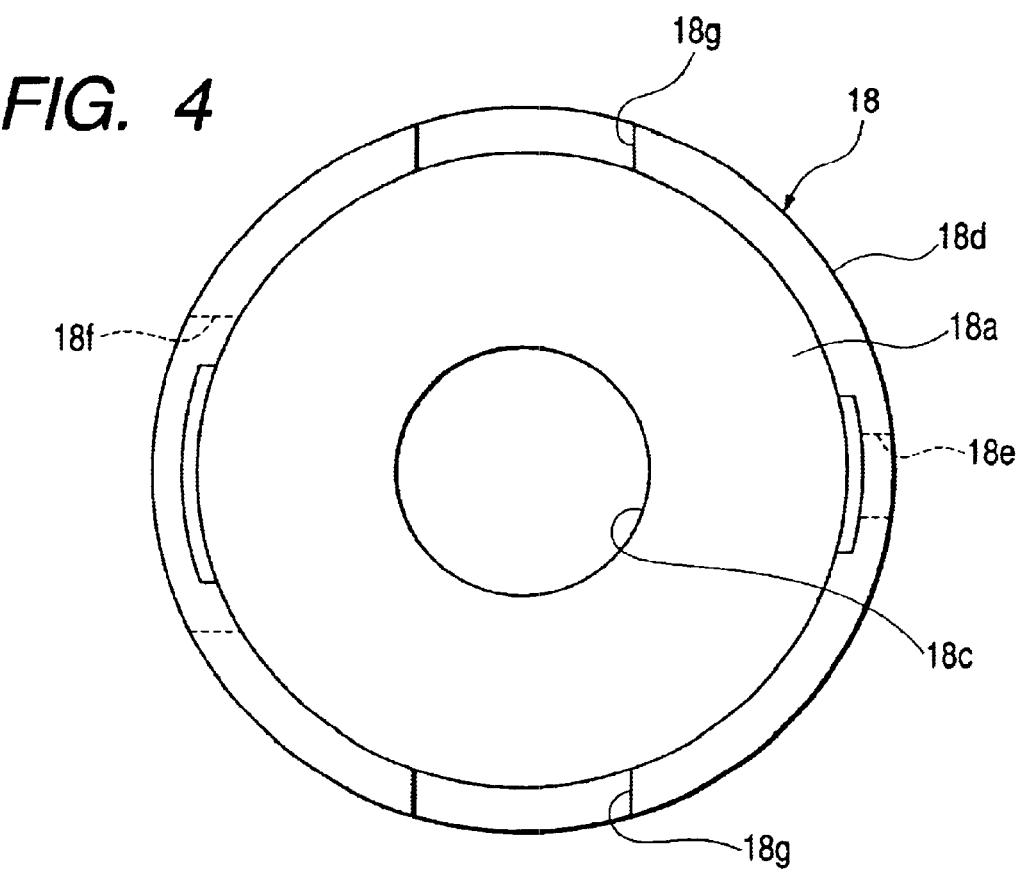
FIG. 4 is an enlarged plan view of a pressing member.
Figure 5:
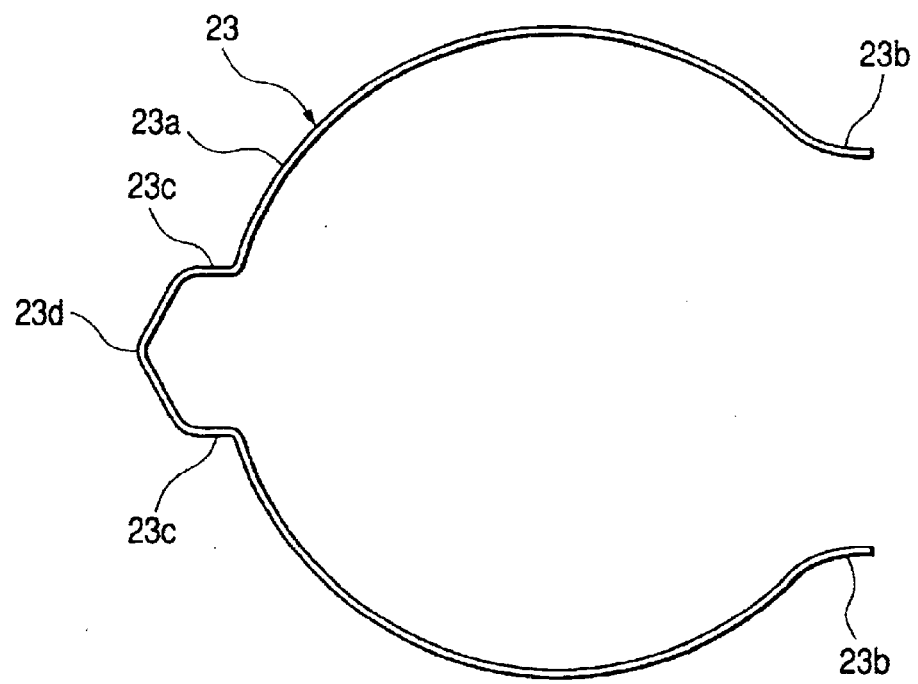
FIG. 5 is an enlarged plan view of a click engaging piece.
Figure 6:
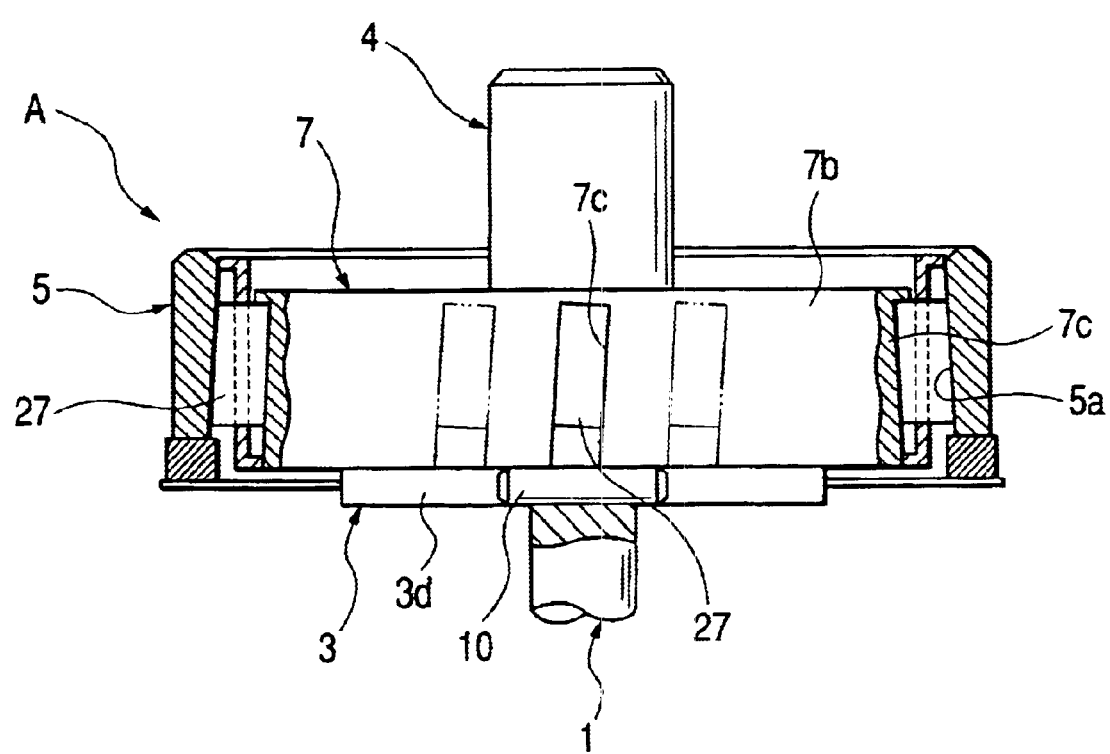
FIG. 6 is a diagram explaining the layout of the rolling members of the braking device making use of the sliding frictional force of the rolling members.

Hereafter, a description will be given of an embodiment according to the invention with reference to the drawings. FIG. 1 is a sectional plan view of a spool of a spinning reel for fishing; FIG. 2 is a sectional plan view of a braking device utilizing the sliding frictional force of rolling members; FIG. 3 is an exploded sectional plan view of the spool; FIG. 4 is an enlarged plan view of a pressing member; FIG. 5 is an enlarged plan view of a click engaging piece; FIG. 6 is a diagram explaining the layout of the rolling members of the braking device utilizing the sliding frictional force of the rolling members.

The spinning reel for fishing includes a spool 2 attached to a distal end of a spool shaft 1 which is supported non-rotatably by an unillustrated reel body and projects forwardly. The spool shaft 1 includes a large-diameter portion 1a, a small-diameter portion 1b which is formed as a stepped portion on the distal end side of the large-diameter portion 1a and whose diameter is smaller than that of the large-diameter portion 1a, and a threaded portion 1c formed at a tip portion of the small-diameter portion 1b.

Through holes 1d and 1e perpendicular to the axial direction are bored in the small-diameter portion 1b. A disk-like holding member 3 for holding a braking device A and a tubular supporting member 4 for supporting the spool 2 are fitted on an outer periphery of the small-diameter portion 1b. Engaging pins 10 and 11 are inserted through the through holes 1d and 1e, respectively. The engaging pin 11 is detachably inserted.

The spool 2 includes on its inner side a partition wall portion 2a for partitioning front and rear portions, a shaft hole 2b formed in the center of the partition wall portion 2a, a recessed portion 2c which is formed on a front side of the partition wall portion 2a and into which a bearing 12 is fitted, a large-diameter recessed portion 2d formed on a front of the partition wall portion 2a, and a more larger-diameter recessed portion 2e formed on a front of the larger-diameter recessed portion 2d. A threaded portion 2f is formed on an inner periphery of the large-diameter recessed portion 2e. A large diameter recessed portion 2g is formed on a rear side of the partition wall portion 2a.

An outer shape of the spool 2 is formed by a fishing-line winding barrel portion 2h around an outer periphery of which the fishing line is wound, a collar portion 2i formed on a front side, and a large-diameter tubular portion 2j formed on a rear side, a stepped portion 2k being formed on the front side of the collar portion 2i. An outer-side holding member 5 of the braking device A is fitted to the inner side of the large-diameter recessed portion 2g in a rear portion of the inner side of the fishing-line winding barrel portion 2h in such a manner as to be prevented from rotating, and is prevented from coming off by a ring 13 and a coming-off preventing ring 14.

A pressing member 15 is accommodated in the large-diameter recessed portion 2d on the front side, and an elastic seal member 16 formed by an O-ring, a dish-like ratchet ring 17 of a click mechanism B. A pressing member 18 constituted by a dish-like click engaging holder are accommodated in the large-diameter recessed portion 2e. A hard annular collar portion 19 is superposed by the collar portion 2i in such a manner as to be fitted to the stepped portion 2k on the front side of the collar portion 2i, and is fastened by a nut member 6.

The disk-like holding member 3 is arranged such that a large-diameter disk portion 3a and a small-diameter disk portion 3b whose diameter is smaller than that of the large-diameter disk portion 3a, which are formed integrally therewith, and a shaft hole 3c is formed at the center thereof. A slot 3d is formed in a rear-side surface of the large-diameter disk portion 3a, and a plurality of keyways 3e are formed in an outer periphery of the small-diameter disk portion 3b. The small-diameter portion 1b of the spool shaft 1 is inserted into the shaft hole 3c, and the engaging pin 10 is inserted into the slot 3d. An inner-side holding member 7 of the braking device A is fitted to the outer periphery of the small-diameter disk portion 3b, and is prevented from rotating by keys 20.

The tubular supporting member 4 is arranged such that a shaft hole 4b is formed in the center of a tubular portion 4a, and a through hole 4c perpendicular to the axial direction is formed. The engaging pin 11 is detachably inserted in the through hole 4c. Recessed portions 4d and 4e are respectively formed in an inner periphery and an outer periphery of a rear end of the tubular portion 4a, and elastic seal members 21 and 22 formed by O-rings are fitted therein. Fitted to the outer periphery of the tubular portion 4a are the shaft hole 2b of the spool 2, the bearing 12, the pressing member 15, the dish-like ratchet ring 17 of the click mechanism B, and the pressing member 18 constituted by the dish-like click engaging holder.

A central through hole 17a and click teeth 17c are formed in the center of the bottom of the dish-like ratchet ring 17 and on an inner periphery of an outer peripheral wall 17b thereof, respectively.

The pressing member 18 is formed by an inner-side bottom 18a, a pressing surface 18b on the outer side of the bottom 18a, a central through hole 18c in the bottom 18a, an outer peripheral wall 18d, through holes 18e and 18f bored in the outer peripheral wall 18d, and a pair of rotation-preventing notches 18g and 18f formed in the outer peripheral wall 18d.

A click engaging piece 23 is fitted in the pressing member 18. As shown FIG. 5, the click engaging piece 23 is formed by an arcuate portion 23a, a pair of retaining portions 23b which are free ends of the arcuate portion 23a, a pair of parallel slidably guiding portions 23c, and a chevron-shaped inclined portion 23d.

The click engaging piece 23 is inserted in the outer peripheral wall 18d of the pressing member 18, the pair of slidably guiding portions 23c and the chevron-shaped inclined portion 23d are inserted in the through hole 18e, and the pair of retaining portions 23b are retained by both edges of the through hole 18f. The chevron-shaped inclined portion 23d is engaged with the click teeth 17c formed on the inner periphery of the outer peripheral wall 17b of the dish-like ratchet ring 17.

The pressing member 18 is fitted to a drag adjusting member 8. An annular elastic seal member 9 is clamped between the drag adjusting member 8 and the pressing member 18.

A nut portion 24a of a nut body 24 non-rotatably fitted to an inner side of the drag adjusting member 8 is threadedly engaged with the threaded portion 1c formed at the distal end of the spool shaft 1 so that the drag adjusting member 8 is fitted to the spool shaft 1.

The nut member 6 is formed by a tubular portion 6a, a collar, portion 6b, a threaded portion 6c on an outer periphery of the tubular portion 6a, and an opening 6d formed by a recessed portion on the inner side of the collar portion 6b. The threaded portion 6c is threadedly engaged with the threaded portion 2f of the spool 2, and the elastic seal member 16 constituted by the O-ring is pressed by the tip of the tubular portion 6a. The annular elastic seal member 9 clamped between the drag adjusting member 8 and the pressing member 18 is in sliding contact with an inner peripheral surface of an edge portion of the opening 6d of the nut member 6.

The annular elastic seal member 9 is made of hard rubber or the like, and is formed by a hook-shaped first elastic acting portion 9a, a fitting portion 9b, a second elastic acting portion 9c between the first elastic acting portion 9a and the fitting portion 9b, and a connecting thick-walled portion 9d between the first elastic acting portion 9a and the second elastic acting portion 9c.

The tip of the first elastic acting portion 9a is brought into sliding contact with the inner peripheral surface of the edge portion of the opening 6d of the nut member 6 opposed thereto. The fitting portion 9b is clamped between the drag adjusting member 8 opposed thereto, and the pressing member 18 with a washer interposed between the fitting portion 9b and the pressing member 18. The second elastic acting portion 9c is formed with a small thickness so as to allow its deformation at the time of the contact of the first elastic acting portion 9a. The connecting thick-walled portion 9d is constructed so as to secure contact elastic pressure for the first elastic acting portion 9a.

A knob operating portion 8a is formed on the obverse surface of the drag adjusting member 8, while a tubular portion 8b and a plurality of arm portions 8c are formed on the reverse surface thereof, a hook portion 8d being formed at a tip of each arm portion 8c. The hook portions 8d are retained at the through holes 18e and 18f of the pressing member 18. Therefore, drag adjusting member 8, the annular elastic seal member 9, and the pressing member 18 are formed as a unit.

A rotation preventing surface 8e is formed on an inner surface of the tubular portion 8b. A rotation preventing surface 24b formed on the nut body 24 is engaged therewith. A spring 26 is inserted between the nut body 24 and the bottom 18a of the pressing member 18.

The braking member A is formed by the outer-side holding member 5, the inner-side holding member 7, rolling members 27, and a holder 28 for holding the rolling members 27. The outer-side holding member 5 is formed in a tubular shape. A tapered surface 5a having the shape of a truncated cone is formed on an inner side thereof. The inner-side holding member 7 has a tubular portion 7a whose outer shape is a truncated cone, and a plurality of grooves 7c into which the rolling members 27 are fitted and which are inclined with respect to the axial direction are formed in an outer peripheral tapered surface 7b.

A collar portion 7d is formed on the inner side of the tubular portion 7a in such a manner as to be directed toward the center, and a through hole and a plurality of keyways 7e are formed in the center. The keys 20 are pressed and inserted in the keyways 3e of the disk-like holding member 3 and the keyways 7e of the inner-side holding member 7, so that the holding member 3 and the inner-side holding member 7 are formed as a unit.

When the spool 2 and the click mechanism B formed integrally with the drag adjusting member 8 are built on the distal end of the spool shaft 1, the disk-like braking-device holding member 3 and the tubular spool supporting member 4 are fitted over the outer periphery of the small-diameter portion 1b of the spool shaft 1, the engaging pin 11 is inserted in the through hole 4c and the through hole 1e, and the bearing 12 is fitted over the outer periphery of the tubular portion 4a of the spool supporting member 4.

Next, the click mechanism B formed integrally with the drag adjusting member 8 is fitted over the outer periphery of the tubular portion 4a of the spool supporting member 4, and the nut portion 24a of the nut body 24 on the inner side of the drag adjusting member 8 is threadedly engaged with the threaded portion 1c at the distal end of the spool shaft 1.

As for the above-described braking device A, since the plurality of grooves 7c inclined with respect to the axial direction are formed in the tapered surface 7b of the truncated cone-shaped tubular portion 7a of the inner-side holding member 7, and the rolling members 27 are fitted therein, and since the rolling members 27 are clamped between the outer-side holding member 5 having the tapered surface 5a and the inner-side holding member 7 having the tapered surface 7b, when the spool 2 is rotated with respect to the spool shaft 1, a sliding frictional force is generated in the rolling members 27 due to the taper thread action, thereby applying a brake to the rotation of the outer-side holding member 5 with respect to the inner-side holding member 7.

The adjustment of the braking-force with respect to the braking device A is effected as the outer-side holding member 5 is displaced in the axial direction by operating the drag adjusting member 8 to rotate, which in turn changes the clamping force for the rolling members 27 clamped between the outer-side holding member 5 and the inner-side holding member 7.

If the fishing reel is constructed as described above, since the arrangement is provided such that the braking device A utilizing the sliding frictional force of the rolling members 27 is provided in the rear portion of the inner side of the fishing-line winding barrel portion 2h of the spool 2, it is possible to make effective use of the dead space on the inner side of the rear portion of the spool 2, and it is possible to prevent the fishing reel from becoming large in size. At the same time, water, dust, and the like are not directly attached to or enter the braking device A, so that it is possible to obtain stable braking performance.

In the foregoing description, the large-diameter recessed portion 2g of the spool 2 may be closed by an annular elastic seal member having the same shape as that of the above-described annular elastic seal member 9. The invention is implemented in the above-described form, and offers advantages as described below.

In accordance with the invention, since the arrangement provided is such that a braking device A utilizing the sliding frictional force of rolling members 27 is provided in a rear portion of the inner side of a fishing-line winding barrel portion 2h of a spool 2, it is possible to make effective use of the dead space on the inner side of the rear portion of the spool 2, and water, dust, and the like are not directly attached to or enter the braking device A, so that it is possible to obtain stable braking performance.

What is claimed is:

1. A spinning reel for fishing comprising:
   a spool shaft supported by a reel body;
   a spool which includes a fishing-line winding barrel portion around which a fishing line is wound, and is rotatably supported by the spool shaft;
   a braking device provided in a rear portion of an inner side of the fishing-line winding barrel portion for applying braking force to rotation of the spool, the braking device including,
      an outer-side holding member which is non-rotatably attached to the spool and includes a tapered surface,
      an inner-side holding member which is non-rotatably attached to the spool shaft and includes a tapered surface opposed to the tapered surface of the outer-side holding member, and
      rolling members clamped between the outer-side holding member and the inner-side holding member;
   an adjusting member provided at a distal end portion of the spool shaft for adjusting the braking force by relatively displacing the outer-side holding member and the inner-side holding member in an axial direction of the spool shaft so as to adjust clamping force generated by the rolling members in cooperation with the outer-side holding member and the inner-side holding member, and
   a click mechanism interposed between the adjusting member and the braking device in the axial direction,
   wherein the spool includes a partition wall portion defining the rear portion and a front portion of the fishing-line winding barrel portion.

2. The spinning reel according to claim 1, wherein the click mechanism is provided in the front portion.

* * * * *